United States Patent [19]

Farnum et al.

[11] Patent Number: 4,871,566
[45] Date of Patent: Oct. 3, 1989

[54] OIL-BEARING NUT COMPOSITION AND PROCESS OF MAKING

[75] Inventors: Colin E. Farnum, Etobicoke; Allan A. Torney, Brampton; Bruce P. McKeown, Guelph, all of Canada

[73] Assignee: Canada Packers Inc., Ontario, Canada

[21] Appl. No.: 206,661

[22] Filed: Jun. 15, 1988

[30] Foreign Application Priority Data

Jun. 15, 1987 [CA] Canada .................................. 539681

[51] Int. Cl.$^4$ ........................... A23L 1/20; A23P 1/06
[52] U.S. Cl. ..................................... 426/632; 426/516; 426/518; 426/629
[58] Field of Search ................. 426/516, 518, 629, 632

[56] References Cited

U.S. PATENT DOCUMENTS 3,615,590 10/1971 Avera et al. ........................... 99/128
4,004,037 1/1977 Connick ............................... 426/518
4,639,374 1/1987 Matsunobu et al. ................... 426/43

FOREIGN PATENT DOCUMENTS 1509022 4/1978 United Kingdom .

Primary Examiner—Donald E. Czaja
Assistant Examiner—Helen Pratt
Attorney, Agent, or Firm—Bacon & Thomas

[57] ABSTRACT

An oil-bearing nut composition, especially suitable for industrial use, comprises crushed nut pieces in free-flowable, particulate form. The crushed nut pieces have a particle size range of such that from about 15–70% by weight of the total product, based upon total initial weight of nuts, is in the form of particles having a maximum dimension greater than 500 microns, about 12–80% by weight, on a similar basis, is in the form of particles having a maximum dimension less than 150 microns, and there are no particles larger 15 mm. The nut particles retain from 12–85% of the natural nut oil within their microcellular structure. The composition may include an edible stabilizer, which effectively forms a film bounding the crushed nut particles or clusters of them in the composition. Other, flavoring ingredients such as salt and sugar may also be present. The composition is free flowing, particulate, for ease of handling in industrial processes, and is shelf stable, retaining both its natural food freshness and its free flowing characteristics over unrefrigerated storage periods of at least six months.

15 Claims, 1 Drawing Sheet

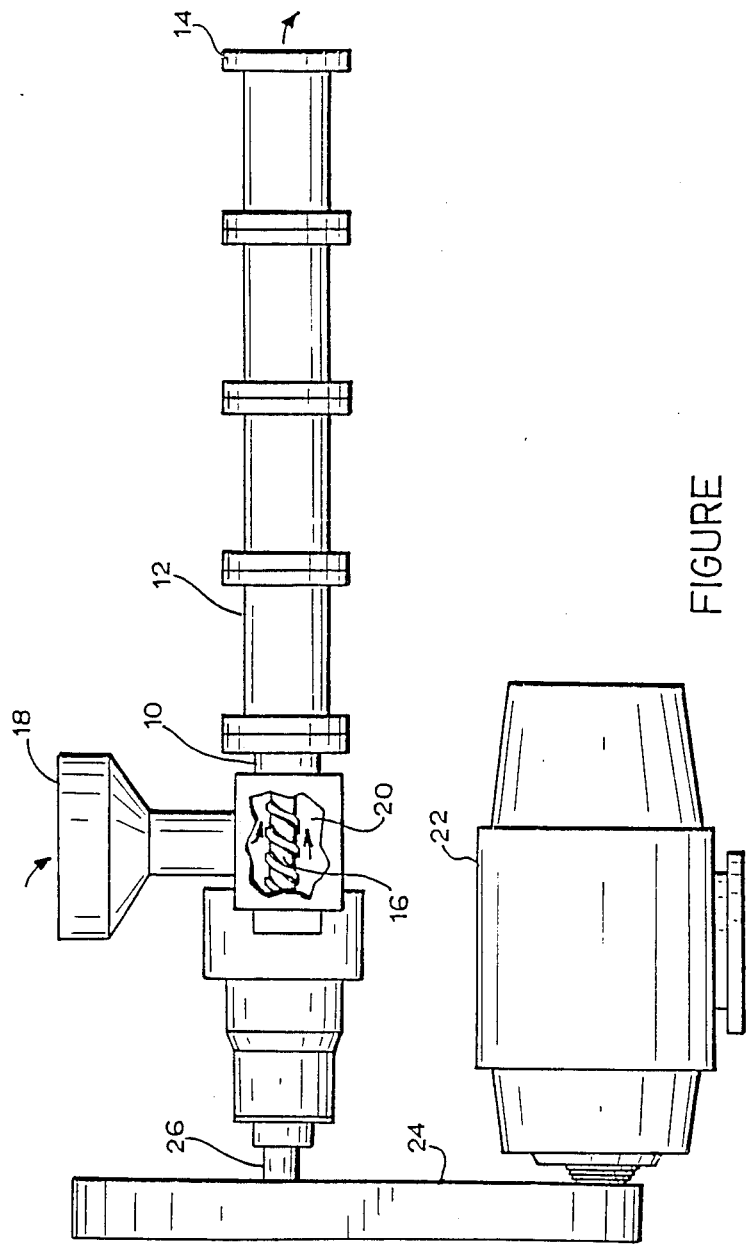

OIL-BEARING NUT COMPOSITION AND PROCESS OF MAKING

FIELD OF THE INVENTION

This invention relates to oil-bearing nut products, and processes for their preparation. More particularly, it relates to preparations of oil-bearing nuts, e.g. peanuts, in free flowing form, for industrial uses in preparation of food products.

BACKGROUND AND PRIOR ART

It is usual to prepare peanut preparations for industrial uses e.g. as ingredients in cakes, cookies, confections, and other edible products in the form of semi-solid pastes similar to the familiar peanut butters. These preparations are normally made by milling and homogenizing the peanut pieces to the desired particle size, in the presence of appropriate amounts of sugar and salt as flavourants, and a suitable edible stabilizer such as a hydrogenated vegetable oil. In the milling and homogenizing process, the nutritionally valuable peanut oil is released from the cells of the nuts, but is mixed into the final product and is largely responsible for the semi-solid or buttery consistency of the final product.

There are disadvantages and inconveniences associated with the use of such peanut butters, especially on an industrial scale. For example, its very consistency renders it difficult to handle, since it cannot be poured vessel to vessel, nor can it be cut into solid pieces of pre-determined shape and size, at convenient temperatures. It is notoriously sticky, and will adhere to basically any surface it encounters during good preparation processes, at room temperatures. Moreover, peanut butter has a relatively short shelf life. The oil is freely accessible to oxygen in the air, so that oxidation to rancidity occurs relatively quickly. Both its consistency and its flavour characteristics deteriorate on storage, even in sealed containers, over a period of six months or so, unless kept under refrigeration. It is nevertheless desirable that the product should include substantial amounts of the natural nut oil, since the oil is nutritionally valuable and flavour-conferring.

It is an object of the present invention to provide a novel oil-bearing nut composition in which at least one of the above disadvantages is overcome or reduced, and a process for preparing it.

SUMMARY OF THE INVENTION

It has now been found that oil bearing nuts such as peanuts, cashews and almonds can be subjected to a crushing and extruding process under conditions of low shear, low pressure and low temperatures, to produce a granular product which still contains the natural oil in significant amounts within its microcellular structure, and is hence substantially free flowing. The produce has substantial amounts of very fine particles, substantial amounts of relatively coarse particles and only very small amounts of intermediate sized products. The oil released to the exterior surfaces of the nut particles is insufficient to cause the composition to assume a pasty, semi-solid nature, but allows the product to assume a substantially free flowing nature.

Thus according to one aspect, the present invention provides a substantially free-flowing, solid, particulate oil-bearing nut composition for use in edible products the composition comprising nut particles, from about 15–70% by weight of the product, based on the initial weight of oil-bearing nuts, being in the form of nut particles which have a maximum dimension greater than 500 microns, from about 12%–80%, by weight, on the same basis, being in the form of particles have a maximum dimension less than 150 microns, the composition being substantially free of nut particles having a maximum dimension greater than 15 mm, the composition containing substantially all of its original natural nut oil, and from 12–85% of the original natural nut oil being unextractable from the nut particles by aqueous detergent washing at 25° C. under non-shear conditions.

According to another aspect of the present invention, there is provided a process for preparing a free flowing, solid, particulate, oil bearing nut composition, which comprises dry mixing, crushing and extruding nut pieces under conditions of low shear and low pressure, at temperatures in the approximate range 10°–95° C., so as to retain from 12–85% of the natural nut oil with the product in a form in which it is not extractable from the nut particles on simple room temperature aqueous detergent washing, and recovering an extruded, substantially free flowing, particulate oil bearing nut composition therefrom.

The products of the present invention have a consistency resembling that of soft sugar. The can be scooped or poured as free flowing particulate solid materials, rendering quantity measurements thereof simple and accurate. They still contain all or substantially all of the natural nut oil, substantial amounts of it being unextractable by simple washing procedures outlined above and hence probably, for the most part, still contained within the microcellular structure of the nut pieces. This nutritionally valuable oil is releasable on heating to break the cellular structure of the nut pieces, e.g. on cooking to prepare cakes, cookies, confections and the like. Not more than 25% by weight of the nut particles are in the intermediate-sized, 150–500 micron size range.

DESCRIPTION OF THE PREFERRED EMBODIMENTS

Preferably, the compositions of the present invention additionally contain minor amounts of an edible stabilizer. The stabilizer used in the compositions of the present invention appear to act as a form of encapsulating medium, effectively to surround the particles or small clusters thereof, of from about 2 to about 50 crushed nut particles. To fulfill this function, the stabilizer is intimately and homogeneously dispersed throughout the composition, and is preferably added to the mixing and extruding step of preparing the composition. Suitable edible stabilizers include those conventionally used in the preparation of peanut butter compositions, for example, hydrogenated vegetable oil, monoglycerides, diglycerides, fatty acids and the like, and mixtures thereof. Suitable amounts of stabilizer for use in the present invention range from about 1% to 10%, preferably 1–2%, based upon the weight of the crushed nut particles. The presence of stabilizer enhances the shelf life of the product.

Whilst it is not intended to be bound by any particular theory of the mode of action or theoretical structure of the compositions of the present invention, it is believed that the formation of films or membranes of suitable stabilizer materials, effectively encasing or encapsulating small clusters of crushed nut particles of appropriate size, has the effect of both hindering or retarding the loss of flavour characteristics, so as to improve the shelf life of the product, and also of preventing agglomeration of large numbers of the crushed nut particles on storage into a solid or semi-solid mass. This action of the stabilizer, together with the fact that substantial amounts of the natural nut oil are retained within the cellular structure of the nut pieces rather than released into the composition as a whole, is believed responsible for the desirable consistency of the final product, as well as its retention of such consistency over extended storage periods.

The compositions of the present invention may contain other ingredients such as sugar and salt for flavouring purposes, in known amounts, added prior to the preparation of the compositions. However, such ingredients are not essential for the retention of the consistency of the compositions. The supply of such compositions free from added flavourants provides greater flexibility in recipe formulations, to the industrial user or baker. When the compositions are not prepared from recipes containing stabilizer, salt and sugar, they tend to have a higher proportion of small size particles.

The process of the present invention, to prepare compositions which contain significant amounts of the nutritionally valuable natural nut oil in a form which is not readily extractable by simple washing and is probably mostly retained within the cellular structure of the nut particles, is basically one of extrusion under mild conditions. Accordingly, in preparation of the compositions according to the present invention, methods and conditions are adopted which effectively retain the microcellular structure of the nut pieces. Thus, one should avoid high temperature processing which would risk breaking down the cell walls and releasing the nut oil from therein. One should also avoid methods of comminution of the nuts or nut pieces which would mechanically rupture the cell walls to release the oil. The preferred method of preparing the product, therefore, involves a process of crushing the nut pieces under controlled, cool temperature conditions in the presence of the stabilizer. Milling and homogenizing processes which reduce the nut particle size by shearing processes are preferably avoided. A suitable crushing apparatus is an extruder screw, in which the nut pieces are compressed and crushed and hence reduced to the required particle size distribution by the compression action of the Archimedean screw. Such a screw extruder can readily be provided with a cooling jacket, for the circulation of fluid therethrough, to prevent excessive rise in temperature as a result of the crushing operation. Temperatures should be controlled within the 10°-90° C. range, preferably 10°-32° C. range, to avoid substantial amounts of cell rupture. Outlet conditions from the extruder should be arranged to avoid excessively high shear, which might also effect cell rupture.

The condition of shear experienced in the extruder can be adjusted so as to vary the composition of the final product. When relative high shear is encountered e.g. by use of an extruder die plate, restricted orifice size, extruder tube etc at the outlet end, back pressure is exerted on the material and the severity of the extrusion conditions is increased. This leads to a product of relatively small particle size. A preferred small particle size product has from about 15-45% by weight most preferably 20-35% by weight, in the form of nut particles having a maximum dimension greater than 500 microns, from about 45-80% by weight, preferably 55-75% by weight, in the form of nut particles having a maximum dimension less than 150 microns, the product being substantially free of nut particles having a maximum dimension greater than 5 millimeters, and retaining 12-70% of the natural nut oil unextractable by room temperature, non-shear, aqueous detergent washing. Care should be taken in selecting the correct outlet die configuration when producing such a product at high throughput speeds to avoid generation of excess back pressure. Such a product is particulate and free flowing and is especially useful in fillings and confections where detection of individual nut pieces in the product is not desired.

On the other hand, the shear condition can be changed to produce a coarser particulate product, simply by altering the exit conditions. One can remove the exit die plate from the downstream end of the extruder altogether, so that the exit is from the full internal cross section of the extruder barrel, without hindrance or obstruction. High throughput speeds can now be arranged without risk of generating back pressures. A preferred coarse particle size product produced this way has from about 55-70% by weight of the nut particles having a maximum dimension greater than 500 microns, from about 12-25% by weight in the form of nut particles having a maximum dimension less than 150 microns, and no substantial amount of nut particles having a maximum dimension greater than 15 millimeters, 55-85% of the original natural nut oil being unextractable by room temperature, non-shear, aqueous detergent washing. Such a coarse product is particularly desirable for incorporation in cookies, where the detection of individual nut pieces on the consumer's palate is desirable.

It is a particularly advantageous feature of the process of the invention that it is versatile enough to produce a wide variety of free flowing particulate nut products with particle size ranges within the aforementioned limits. Accordingly, products can be made to a customer's specification, by simple adjustments of the shear condition, e.g. changes in the outlet design. A customer previously might have been required to purchase two or more different nut products and blend them together to produce the characteristics desired in the final edible products. With products of the present invention, a wide variety of characteristics can be arranged, by simple process adjustments, to meet a customer's needs in the product. The versatility of the process is a very significant advantage. The industrial baker can be provided with a fine product for use in baked confection, or a coarse product for use in nut-flavoured cookies, all the products being free flowing for ease of handling, measuring, storage and the like. The low content of intermediate sized particles is significant in conferring the desirable properties on the product.

BRIEF REFERENCE TO THE DRAWING

The accompanying FIGURE is a diagrammatic illustration of an apparatus for use in making the products of the preferred embodiment of the invention.

DETAILED DESCRIPTION OF THE SPECIFIC PREFERRED EMBODIMENTS

The apparatus diagrammatically illustrated is a standard, pilot plant scale food mixing apparatus, which was used in making the products described in the specific examples below. It includes a barrel 10 surrounded by a water jacket 12, the temperature of which is controllable. Within the barrel 10 and extending substantially the full length thereof, to the die disposed within flange 14, is an extruder screw 16. A hopper 18 is provided above an entrance chamber 20 at the upstream end of the barrel 10 from which solid particulate mixtures may be fed. Variable speed driving means comprising a motor 22, gear train 24 and drive shaft 26 are provided, to drive the extruder screw 16, and hence to extrude product through a die plate extruding from flange 14.

In the actual apparatus used, the internal diameter of the barrel 10 was about 2¼ inches, the extruder screw diameter was 2 ¼ inches and each section of the barrel had a length of about 10 ½ inches, for a total screw length of about 52 inches. The screw had a compression ratio of 3.4 to 1.

The invention is further described in the following specific examples.

EXAMPLES 1-26

A series of experiments was conducted using the above equipment, namely a Bonnot 2.25 inch extruder, with various formulations and extrusion rates, and various configurations of extrusion outlet. The extruder head had a removable solid stainless steel plate to cover the extruder outlet, with a small, approximately 3 mm hole in the center to allow product to exit. If desired, an interchangeable die could be fitted over this outlet, one having three holes, another having a 6 inch tubular extension from the die face with inside diameter decreasing from 10 mm to 3 mm, and a third having a 14 inch tubular extension with similarly decreasing diameter. Alternatively for making coarser products, the die plate is removed altogether. The procedure was initially to mix the dry formulation ingredients until they were evenly distributed, pour the mixture into the extruder feed hopper, turn on water to the four jackets and adjust the temperatures as desired, set the speed controller to the desired setting and allow the output to stabilize, then collect samples of the product from the extruder head. In each case, a granular, powdery, substantially free flowing product was obtained, sometimes initially as pellets which promptly disintegrated to powder on light impact or shaking, or as dry powder when the exit die plate is removed. The conditions and results are given below in Table 1.

TABLE 1

| EXAMPLE | OUTLET | FORMULATION | | | CONDITIONS | SCREW SPEED |
|---|---|---|---|---|---|---|
| 1. | Triple hole | Roasted peanuts | 100 | parts | Infeed jacket - 92° C. | 125 kg/hr |
| | | Fox-x | 1.8 | part | Other jackets - no heat supplied | throughput |
| | | Fix-x | 1.8 | parts | | |
| | | Maltodextrins | 5.0 | parts | | |
| | | Salt | 1.0 | part | | |
| | | Icing Sugar | 3.0 | parts | Outlet temperature 35–60° C. | |
| 2. | 6" die × 3 mm | Roasted peanuts | 100 | parts | Infeed jackets 60° C. | 125 kg/hr throughput |
| | | Fix-x | 2 | parts | Other jackets no heat supplied | |
| | | Dextrose | 6 | parts | | |
| | | Salt | 1.1 | part | | |
| 3. | No die, 3 mm hole at head | Roasted peanuts | 100 | parts | Infeed jackets 162° C. Other jackets no heat supplied | 125 kg/hr throughput |
| | | Fix-x | 2 | parts | | |
| 4. | No die | Roasted peanuts | 100 | parts | All jackets 10° C. | 137 kg/hr throughput |
| | | Icing Sugar | 4.5 | parts | | |
| | | Stabilizer | 1.8 | parts | | |
| 5. | No die | Roasted peanuts | 100 | parts | Infeed and first jacket - room temp. 3rd and 4th jackets, 10° C. | 137 kg/hr throughput |
| | | Icing Sugar | 4.5 | parts | | |
| | | Stabilizer | 1.8 | parts | | |
| 6. | No die | Roasted peanuts | 100 | parts | Infeed and first 2 jackets, room temp., 4th jacket 10° C. | 137 kg/hr throughput |
| 7. | No die | Roasted peanuts | 100 | parts | All jackets cooled to 10° C. | 137 kg/hr throughput |
| 8. | No die | Roasted peanuts | 100 | parts | All jackets cooled to 10° C. | 137 kg/hr through put |
| | | Fix X | 1 | part | | |
| | | Salt | 1.1 | part | | |
| | | Icing Sugar | 4.5 | parts | | |
| 9. | No die | Roasted | | | All jackets cooled | 137 kg/ |

TABLE 1-continued

| EXAMPLE | OUTLET | FORMULATION | | | CONDITIONS | SCREW SPEED |
|---|---|---|---|---|---|---|
| | | peanuts | 100 | parts | to 10° C. | hr throughput |
| | | Fix X | 1.5 | parts | | |
| | | Salt | 1.1 | part | | |
| | | Icing Sugar | 4.5 | parts | | |
| 10. | No die | Roasted peanuts | 100 | parts | All jackets cooled to 10° C. | 137 kg/throughput |
| | | Fix X | 1.8 | parts | | |
| | | Salt | 1.1 | part | | |
| | | Icing Sugar | 4.5 | parts | | |
| 11. | No die | Blanched peanuts | 100 | parts | All jackets cooled to 10° C. | 137 kg/hr throughput |
| | | Salt | 1.1 | parts | | |
| | | Dextrose | 2 | parts | | |
| | | Fix-X | 1.8 | parts | | |
| 12. | No die | Blanched peanuts | 100 | parts | All jackets cooled to 10° C. Exit temp. 32° C. | 137 kg/hr throughput |
| | | Salt | 1.1 | parts | | |
| | | Dextrose | 3 | parts | | |
| | | Fix-X | 1.8 | parts | | |
| 13. | No die | Blanched peanuts | 100 | parts | All jackets cooled to 10° C. exit temp. 34° C. | 137 kg/hr throughput |
| | | Salt | 1.1 | parts | | |
| | | Dextrose | 6 | parts | | |
| | | Fix-X | 1.8 | parts | | |
| 14. | No die | Blanched peanuts | 100 | parts | All jackets cooled to 10° C. exit temp. 25° C. | 137 kg/hr throughput |
| | | Fix-X | 1.8 | parts | | |
| | | Dextrose | 6.0 | parts | | |
| 15. | No die | Blanched peanuts | 100 | parts | All jackets cooled to 20° C., exit temp. 30° C. | 137 kg/hr throughput |
| | | Salt | 1 | part | | |
| | | Fix-X | 1.8 | parts | | |
| | | Dextrose | 6 | parts | | |
| 16. | No die peanuts | Blanched | 100 | parts | All jackets cooled to 10° C. exit temp. 27° C. | 137 kg/hr throughput |
| | | Salt | 1 | part | | |
| | | Dextrose | 6 | parts | | |
| | | Myvatex 820-E | 1.8 | parts | | |
| 17. | No die | Blanched peanuts | 100 | parts | All jackets cooled to 10° C., exit temp. 28° C. | 137 kg/hr throughout |
| | | Salt | 1.1 | part | | |
| | | Dextrose | 6 | parts | | |
| | | SSL | 1 | part | | |
| 18. | No die | Blanched peanuts | 100 | parts | All jackets cooled to 10° C., exit temp. 28° C. | 137 kg/hr throughput |
| | | Salt | 1.1 | part | | |
| | | Dextrose | 6 | parts | | |
| | | SSL | 2 | parts | | |
| 19. | No die | Roasted almonds | 100 | parts | All jackets cooled to 10° C. exit temp. 28° C. | 137 kg/hr throughput |
| 20. | No die | Roasted almonds | 100 | parts | All jackets cooled to 10° C. exit temp. 28° C. | 137 kg/hr throughput |
| 21. | No die | Roasted cashews | 100 | parts | All jackets cooled to 10° C. exit temp. 28° C. | 137 kg/hr throughput |
| 22. | No die | Roasted cashews | 100 | parts | All jackets cooled to 10° C. exit temp. 28° C. | 137 kg/hr throughput |
| | | Salt | 1.1 | part | | |
| | | Dextrose | 6 | parts | | |
| | | Fix-X | 1.8 | part | | |
| 23. | No die | Roasted peanuts | 100 | parts | All jackets cooled to 10° C. exit temp. 28° C. | 137 kg/hr throughput |
| | | Salt | 1.1 | part | | |
| | | Cantab | 1 | part | | |
| | | Fix-X | 1.6 | part | | |
| 24. | No die | Roasted | | | All jackets cooled | 137 kg/hr |

TABLE 1-continued

| EXAMPLE | OUTLET | FORMULATION | | CONDITIONS | SCREW SPEED |
|---|---|---|---|---|---|
| | | peanuts | 100 parts | to 10° C., exit temp. 29.5° C. | throughput |
| | | Salt | 1.1 part | | |
| | | Cantab | 6 parts | | |
| | | Fix-X | 1.6 part | | |
| 25 | Die plate removed | Roasted Peanuts | 100 parts | All jackets cooled to 15° C. Exit T: 40° C. | 300 kg/hr throughput |
| 26 | Die plate removed | Roasted Peanuts | 100 parts | As in 25 | As in 25 |
| | | Fix X | 1.8 parts | | |
| | | Salt | 1.2 parts | | |
| | | Dextrose | 6.6 parts | | |

"Fix-X" is a trade mark denoting commercially available hydrogenated vegetable oil stabilizer, known for use in association with peanut butters.

"Myvatex 820-E" is a trade mark denoting a commercially available stabilizer for peanut butter consisting essentially of hydrogenated vegetable oils with mono- and diglycerides.

SSL denotes sodium stearoyl-2-lactylate, a stabilizer normally used in food products such as coffee whiteners, comprising a blend of fatty acids.

"Cantab" is a trade mark for a commercially available brand of a microporuous crystalline dextrose.

EXAMPLE 27

The products of some of the previous examples were tested for particle size distribution and retained oils.

For this purpose, the granulated nut product (50 g) was mixed with 5 g Triton X-165 detergent and 200 g cold water, and stirred slowly until a homogeneous slurry was formed. The slurry was poured into a separating funnel and allowed to stand until the fat had completely separated. Then the aqueous fraction was decanted from the funnel and collected on head held sieves of (U.S. Standard Mesh) 35, 80 and 100 mesh. The remaining aqueous fraction was filtered through number 54 filter paper using a buchner funnel. The sieves and paper were dried in a vacuum oven at 110° C. under 30" Hg vacuum, and weighed to determine particle size distribution and percent retained peanut oil.

The retained oil is calculated based on the assumption that the initial oil content is 49% of roasted peanut weight. Then the retained percent is calculated by application of the formula $$100 - \frac{100 \times (\text{initial peanut wt} - \text{retained wt on screen \& Paper})}{0.49 \times \text{initial peanut weight}}$$

The results are given below in Table 2. The amounts of various particle size components are expressed as percentages based on the total weight of starting nuts. None of the samples had any particles with maximum diameter greater than 15 mm. Those which are held by 35 mesh screen have particle sizes greater than 500 microns. Those which pass the 100 mesh screen have particles sized less than 150 microns.

TABLE 2

| Example No. | Retained by 35 Mesh Screen % | Pass 100 Mesh Screen % | Calculated Nut Oil Retained % |
|---|---|---|---|
| 4 | 24.4 | 69.3 | 21.1 |
| 6 | 17.9 | 80.0 | 56.3 |
| 12 | 26.8 | 62.8 | 26.5 |
| 13 | 32.0 | 56.1 | 48.3 |
| 15 | 42.3 | 47.6 | 65.5 |
| 18 | 21.3 | 66.6 | 21.4 |
| 20 | 26.2 | 55.4 | 38.3 |
| 21 | 16.0 | 75.4 | 19.1 |
| 22 | 35.0 | 57.0 | 22.6 |
| 24 | 36.2 | 50.4 | 12.2 |
| 25 | 57.5 | 19.5 | 60.9 |
| 26 | 66.3 | 15.0 | 81.0 |

What we claim is:

1. A substantially free flowing, solid, particulate, oil-bearing nut composition for use in edible products, the composition comprising nut particles;
   from about 15-70% by weight of the product, based on the initial weight of oil-bearing nuts, being in the form of nut particles having a maximum dimension greater than 500 microns;
   from about 12-80% by weight, on the same basis, being in the form of nut particles having a maximum dimension less than 150 microns;
   the composition being substantially free of nut particles having a maximum dimension greater than 15 millimeters;
   the composition containing substantially all of its original natural nut oil from 12-85% thereof being disposed within the nut particles so as to be unextractable from the nut particles by aqueous detergent washing at 25° C. under non shear conditions.

2. A composition according to claim 1, wherein from about 15-45% by weight is in the form of nut particles having a maximum dimension greater than 500 microns, from about 45-80% by weight is in the form of nut particles having a maximum dimension less than 150 microns, the composition being substantially free of nut particles having a maximum dimension greater than 5 millimeter, and from 12-70% of the original natural nut oil being unextractable from the nut particles by aqueous detergent washing at 25° C. under non-shear conditions.

3. A composition according to claim 1, wherein from about 55-70% by weight is in the nut particles having a maximum dimension greater than 500 microns, from about 12-25% by weight is in the form of nut particles having a maximum dimension less than 150 microns, and from 55-85% of the original natural nut oil being unextractable from the nut particles by aqueous detergent washing at 25° C. under non-shear conditions.

4. A composition according to claim 1, claim 2 or claim 3 further including a minor amount of an edible stabilizer.

5. A composition according to claim 4 wherein the nut particles are selected from the group consisting of peanut particles, cashew particles, almond particles and mixtures of two or more such nut particles.

6. A composition according to the claim 4 wherein the amount of stabilizer is from about 1–2% by weight, based on the weight of the nut particles.

7. A composition according to claim 4 wherein the composition also includes minor amount of granular flavourants selected from the group consisting of salt, sugars and mixtures thereof.

8. A composition according to claim 4 wherein the stabilizer is selected from the group consisting of hydrogenated vegetable oils, monoglycerides, diglycerides, fatty acids and mixtures thereof.

9. A composition according to claim 2, wherein the particles of maximum dimension less than 150 microns constitute from about 45–70% by weight of the total composition.

10. A process for preparting a free flowing, solid, particulate, oil-bearing nut composition, which comprises dry mixing, crushing and extruding nut pieces under conditions of low shear and low pressure, at temperatures in the approximate range 10°–95° C., said conditions being adjusted so as to obtain a composition in which from about 15–70% by weight of the product, based on the initial weight of oil-bearing nuts, is in the form of nut particles having a maximum dimension greater than 500 microns, from about 12–80% by weight, on the same basis, is in the form of nut particles having a maximum dimension less than 150 microns, the composition being substantially free of nut particles having a maximum dimension greater than 15 millimeters, and so as to retain in the composition from 12–85% of the natural nut oil within the nut particles and in a form in which the oil is not extractable by simple room temperature aqueous detergent washing; and recovering an extruded, substantially free flowing particulate oil-bearing nut composition therefrom.

11. A process according to claim 10 wherein the crushing and extruding of the nut pieces takes place in the presence of a minor amount of an edible stabilizer.

12. A process according to claim 11 wherein the crushing and extruding takes place in the presence of granular flavourants selected from the group consisting of salt, sugar and mixtures thereof.

13. A process according to claim 10, wherein the mixing, crushing and extruding of the nut pieces takes place at temperatures within the approximate range of 10°–32° C.

14. A process according to claim 10, wherein the mixing, crushing and extruding takes place under conditions such that from 12–70% of the natural nut oil is retained within the nut particles.

15. A process according to claim 10, wherein the mixing, crushing and extruding takes place under conditions such that 55–85% of the natural nut oil is retained within the nut particles.

* * * * *